United States Patent
Lehto et al.

(10) Patent No.: US 12,001,853 B2
(45) Date of Patent: Jun. 4, 2024

(54) DEVICE BOOTSTRAPPING

(71) Applicant: Arm Limited, Cambridge (GB)

(72) Inventors: Markku Lehto, Oulu (FI); Szymon Sasin, Oulu (FI)

(73) Assignee: Arm Limited, Cambridge (GB)

( * ) Notice: Subject to any disclaimer, the term of this patent is extended or adjusted under 35 U.S.C. 154(b) by 430 days.

(21) Appl. No.: 16/681,393

(22) Filed: Nov. 12, 2019

(65) Prior Publication Data
US 2020/0174798 A1    Jun. 4, 2020

(30) Foreign Application Priority Data
Dec. 3, 2018 (GB) ..................... 1819722

(51) Int. Cl.
*G06F 9/4401* (2018.01)
*G06F 16/955* (2019.01)
*H04L 9/40* (2022.01)

(52) U.S. Cl.
CPC .......... *G06F 9/4416* (2013.01); *G06F 16/955* (2019.01); *H04L 63/0876* (2013.01)

(58) Field of Classification Search
CPC .... G06F 9/4416; G06F 16/955; G06F 21/604; G06F 21/31; G06F 21/6218; H04L 63/0876; H04L 63/10; H04L 63/101; H04L 61/2023; H04L 67/1008; H04L 67/1029; H04W 12/69; H04W 4/70
See application file for complete search history.

(56) References Cited

U.S. PATENT DOCUMENTS

| | | |
|---|---|---|
| 5,349,643 A | 9/1994 | Cox et al. |
| 5,872,968 A | 2/1999 | Knox et al. |
| 6,463,535 B1 | 10/2002 | Drews |
| 6,950,660 B1 | 9/2005 | Hsu et al. |
| 7,363,514 B1 | 4/2008 | Behren |
| 7,882,345 B1 | 2/2011 | Christensen |
| 7,971,045 B1 | 6/2011 | Currid et al. |
| 8,108,455 B2 | 1/2012 | Yeager et al. |
| 8,244,845 B2 | 8/2012 | Rao |
| 8,370,491 B1 | 2/2013 | Breau et al. |

(Continued)

FOREIGN PATENT DOCUMENTS

| | | |
|---|---|---|
| AU | 2013100802 A4 | 7/2013 |
| EP | 2466791 A1 | 6/2012 |

(Continued)

OTHER PUBLICATIONS

Application and File history for U.S. Appl. No. 14/842,065, filed Sept. 1, 2015, Inventors: Szymon, et al.

(Continued)

*Primary Examiner* — Kim Huynh
*Assistant Examiner* — Cory A. Latham
(74) *Attorney, Agent, or Firm* — DeWitt LLP

(57) ABSTRACT

The present techniques generally relate to a computer implemented method of accessing a remote resource by an internet-connectable device, the method comprising: receiving, at the device from the bootstrap server, a first plurality of identifiers each identifier associated with a respective connectivity server; selecting, at the device, a first identifier from the first plurality of identifiers; authenticating with a first connectivity server associated with the selected first identifier.

16 Claims, 8 Drawing Sheets

(56) References Cited

U.S. PATENT DOCUMENTS

| | | | |
|---|---|---|---|
| 9,064,117 B1 | 6/2015 | Worsley | |
| 9,307,405 B2 | 4/2016 | Curtis et al. | |
| 9,860,235 B2 | 1/2018 | Curtis et al. | |
| 10,027,646 B2 | 7/2018 | Curtis et al. | |
| 10,129,268 B2 | 11/2018 | David et al. | |
| 10,185,829 B2 | 1/2019 | Sasin et al. | |
| 10,321,311 B2 | 6/2019 | Sasin et al. | |
| 10,554,731 B2 | 2/2020 | Pak et al. | |
| 2002/0090085 A1 | 7/2002 | Vanstone et al. | |
| 2003/0028763 A1 | 2/2003 | Malinen et al. | |
| 2005/0010758 A1 | 1/2005 | Landrock et al. | |
| 2006/0053276 A1 | 3/2006 | Lortz et al. | |
| 2006/0075242 A1 | 4/2006 | Aissi et al. | |
| 2006/0104234 A1 | 5/2006 | Zhang | |
| 2006/0117177 A1 | 6/2006 | Buer | |
| 2006/0150241 A1 | 7/2006 | Huh et al. | |
| 2006/0200855 A1 | 9/2006 | Willis | |
| 2006/0259765 A1 | 11/2006 | Song et al. | |
| 2006/0277406 A1 | 12/2006 | Hashimoto et al. | |
| 2007/0011446 A1 | 1/2007 | Kato et al. | |
| 2007/0043608 A1 | 2/2007 | May et al. | |
| 2007/0055867 A1 | 3/2007 | Kanungo et al. | |
| 2007/0130476 A1 | 6/2007 | Mohanty | |
| 2007/0143388 A1 | 6/2007 | Futa et al. | |
| 2007/0220266 A1 | 9/2007 | Cooper et al. | |
| 2007/0220589 A1 | 9/2007 | Salowey et al. | |
| 2008/0034207 A1 | 2/2008 | Cam-Winget et al. | |
| 2008/0066166 A1* | 3/2008 | Childs | G06F 21/31 726/5 |
| 2008/0130902 A1 | 6/2008 | Foo et al. | |
| 2009/0013177 A1 | 1/2009 | Lee et al. | |
| 2009/0063851 A1 | 3/2009 | Nijdam | |
| 2009/0086977 A1 | 4/2009 | Berggren | |
| 2009/0129597 A1 | 5/2009 | Zimmer et al. | |
| 2009/0215477 A1 | 8/2009 | Lee et al. | |
| 2009/0276620 A1 | 11/2009 | Mccarron et al. | |
| 2009/0287922 A1 | 11/2009 | Herwono et al. | |
| 2009/0313466 A1 | 12/2009 | Naslund et al. | |
| 2010/0304716 A1 | 12/2010 | Hoeksel et al. | |
| 2011/0154454 A1 | 6/2011 | Frelechoux | |
| 2011/0161663 A1 | 6/2011 | Nakhjiri | |
| 2011/0225296 A1 | 9/2011 | Hong et al. | |
| 2012/0042081 A1 | 2/2012 | Liao et al. | |
| 2012/0079031 A1 | 3/2012 | Matthews et al. | |
| 2012/0108207 A1 | 5/2012 | Schell et al. | |
| 2012/0122423 A1 | 5/2012 | Helmreich | |
| 2012/0221725 A1 | 8/2012 | Schroeder, Jr. et al. | |
| 2013/0035067 A1 | 2/2013 | Zhang et al. | |
| 2013/0081113 A1 | 3/2013 | Cherian et al. | |
| 2013/0095789 A1 | 4/2013 | Keevill et al. | |
| 2013/0150105 A1 | 6/2013 | Clevorn et al. | |
| 2013/0160094 A1 | 6/2013 | Luo | |
| 2013/0174241 A1 | 7/2013 | Cha et al. | |
| 2013/0212215 A1* | 8/2013 | Ukkola | G06F 16/955 709/217 |
| 2013/0222109 A1 | 8/2013 | Lim | |
| 2013/0310003 A1 | 11/2013 | Sadhvani et al. | |
| 2014/0089652 A1 | 3/2014 | Cerri et al. | |
| 2014/0099916 A1 | 4/2014 | Mallikarjunan et al. | |
| 2014/0165147 A1 | 6/2014 | Hershberg et al. | |
| 2014/0289790 A1 | 9/2014 | Wilson | |
| 2014/0330952 A1 | 11/2014 | Starsinic et al. | |
| 2015/0067329 A1 | 3/2015 | Ben Saied et al. | |
| 2015/0071139 A1 | 3/2015 | Nix | |
| 2015/0113592 A1 | 4/2015 | Curtis et al. | |
| 2015/0113599 A1 | 4/2015 | Curtis et al. | |
| 2015/0237031 A1 | 8/2015 | Neuman et al. | |
| 2015/0296470 A1 | 10/2015 | Kim et al. | |
| 2015/0305008 A1 | 10/2015 | Kim et al. | |
| 2015/0319263 A1 | 11/2015 | Koch et al. | |
| 2015/0358824 A1 | 12/2015 | Kim et al. | |
| 2016/0065556 A1* | 3/2016 | Sasin | H04W 4/60 726/5 |
| 2016/0072808 A1 | 3/2016 | David et al. | |
| 2016/0191489 A1 | 6/2016 | Curtis et al. | |
| 2017/0019427 A1 | 1/2017 | Vank et al. | |
| 2017/0039373 A1 | 2/2017 | Sasin et al. | |
| 2017/0041287 A1 | 2/2017 | Pak et al. | |
| 2017/0048336 A1 | 2/2017 | Novo Diaz et al. | |
| 2017/0155554 A1* | 6/2017 | Whittemore | H04L 41/0806 |
| 2017/0251428 A1* | 8/2017 | Jiménez | H04W 48/20 |
| 2018/0279099 A1* | 9/2018 | Novo Diaz | H04W 4/70 |
| 2018/0295119 A1 | 10/2018 | Curtis et al. | |
| 2018/0324168 A1 | 11/2018 | Curtis et al. | |
| 2019/0044957 A1 | 2/2019 | David et al. | |
| 2019/0156040 A1 | 5/2019 | Sasin et al. | |
| 2019/0289467 A1 | 9/2019 | Sasin et al. | |
| 2020/0274707 A1 | 8/2020 | Kiiskilä | |
| 2020/0327233 A1 | 10/2020 | Pak et al. | |

FOREIGN PATENT DOCUMENTS

| | | |
|---|---|---|
| GB | 2533385 A | 6/2016 |
| GB | 2540987 A | 2/2017 |
| GB | 2540989 A | 2/2017 |
| KR | 20140113007 A | 9/2014 |
| WO | WO-2006059195 A1 | 6/2006 |
| WO | WO-2009141493 A1 | 11/2009 |
| WO | WO-2011123329 A1 | 10/2011 |
| WO | WO-2013049292 A1 | 4/2013 |
| WO | WO-2014048236 A1 | 4/2014 |
| WO | WO-2014069968 A1 | 5/2014 |
| WO | WO-2014114354 A1 | 7/2014 |
| WO | WO-2014116152 A1 | 7/2014 |
| WO | WO-2014182674 A1 | 11/2014 |
| WO | WO-2014190177 A1 | 11/2014 |
| WO | WO-2015042370 A1 | 3/2015 |
| WO | WO-2015065913 A1 | 5/2015 |

OTHER PUBLICATIONS

Application and File history for U.S. Appl. No. 16/434,567, filed Jun. 7, 2019, Inventors: Szymon, et al.

Application and File history for U.S. Appl. No. 15/218,902, filed Jul. 25, 2016, Inventors: Pak, et al.

Application and File history for U.S. Appl. No. 15/226,523, filed Aug. 2, 2016, Inventors: Sasin, et al.

Application and File history for U.S. Appl. No. 16/252,896, filed Jan. 21, 2019, Inventors: Sasin, et al.

Certicom Corp., "Certicom Device Certification Authority for ZigBee Smart Energy," Retrieved from the internet: http://www.certicom.com/index.php/device-authentication-device/smart-energy-device-certificate-service, Oct. 2013, 2 pages.

Combined Search and Examination Report for Great Britain Application No. GB1806259.6, dated Jul. 12, 2018, 6 pages.

Combined Search and Examination Report under Section 17 and 18(3) for Great Britain Application No. GB1513748.2, dated Mar. 17, 2016, 7 pages.

Combined Search and Examination Report under Sections 17 and 18(3) for Great Britain Application No. GB1513750.8, dated Mar. 17, 2016, 6 pages.

Examination Report for GB Application No. 1513748.2, dated Nov. 29, 2019, 7 pages.

Examination Report under Section 18(3) for Application No. GB1513750.8, dated Nov. 10, 2017, 3 pages.

First Office Action dated Dec. 29, 2018 for Chinese Application No. 201480056752.8, 38 pages.

HP Device Registration Repository Capability; M2M06-014 Device Registry Repository Capability; ETSI Draft; ETSI/M2M M2M05_025 Device Registry Repository Capability; European Telecommunications Standards Institute, 650, Route Des Lucioles; F-06921 Sophia-Antipolis; France, vol. SmartM2M, Oct. 13, 2009, 2 pages.

International Preliminary Report on Patentability for Application No. PCT/GB2014/053096, dated Apr. 28, 2016, 9 pages.

International Preliminary Report on Patentability for Application No. PCT/GB2014/053097, dated Apr. 28, 2016, 10 pages.

International Preliminary Report on Patentability for Application No. PCT/GB2014/053098, dated Apr. 28, 2016, 14 pages.

(56) References Cited

OTHER PUBLICATIONS

International Search Report and Written Opinion for Application No. PCT/GB2014/053096, dated Jan. 30, 2015, 12 pages.
International Search Report and Written Opinion for Application No. PCT/GB2014/053097, dated Jan. 30, 2015, 15 pages.
International Search Report and Written Opinion for Application No. PCT/GB2014/053098, dated Apr. 8, 2015, 20 pages.
Klas G., et al., "Lightweight M2M: Enabling Device Management and Applications for the Internet of Things," White Paper, Vodafone, Arm and Ericsson, Feb. 26, 2014, 16 pages.
Panwar M., et al., "Security for IoT: An Effective DTLS with Public Certificates," 2015 International Conference on Advances in Computer Engineering and Applications (ICACEA), IEEE, Mar. 2015, pp. 163-166.
Partial International Search Report for Application No. PCT/GB2014/053098, dated Jan. 29, 2015, 5 pages.
Schukat M., et al., "Public Key Infrastructures and Digital Certificates for the Internet of Things," IEEE 2015, 26th Irish Signals and Systems Conference (ISSC), Jun. 2015, 5 pages.
Search Report under Section 17(5) for Great Britain Application No. GB1415861.2, dated Mar. 18, 2015, 3 pages.
Search Report under Section 17(5) dated Jan. 12, 2015 for GB Application No. 1415562.6 , 5 pages.
Second Office Action dated May 17, 2019 for Chinese Application No. 201480056752.8, 9 pages.
Application and File history for U.S. Appl. No. 16/281,870, filed Feb. 1, 2019. Inventor: Kiiskilä.
Application and File history for U.S. Appl. No. 16/380,110, filed Apr. 10, 2019. Inventors: Pak et al.
Search Report dated Mar. 22, 2019 for GB Application No. 1819722.8, 10 pages.
Open Mobile Alliance, "Lightweight Machine to Machine Technical Specification: Core", Version 1.1, published Jun. 12, 2018, OMA. Available from http://openmobilealliance.org/RELEASE/Lightweight/M2M/V1_1-20180612-C/OMA-TS-LightweightM2M_Core-V1_1-20180612-C.pdf [accessed on Mar. 13, 2019], 23 pages.
English translation of Chinese Office Action corresponding to 201911217065.0 dated Nov. 1, 2022.

* cited by examiner

DEVICE BOOTSTRAPPING

RELATED APPLICATION

The present application claims priority to GB Application No. 1819722.8 filed Dec. 3, 2018, which is hereby incorporated herein in its entirety by reference.

The present techniques generally relate to bootstrapping an internet-connectable device to provide the device with access to one or more resources.

The Internet of Things (IoT) encompasses devices and networks that are (Internet Protocol) IP-enabled and Internet-connected, along with the Internet services monitoring and controlling those devices. Such IP-enabled devices connected to the internet may be termed data processing devices, end nodes, remote devices or Internet of Things devices and include sensors, machines, active positioning tags, radio-frequency identification (RFID) readers and building automation equipment to name but a few. Such an IP-enabled device is hereafter referred to as "device."

Devices in the IoT may generally, but not necessarily, be resource-limited embedded devices, often battery powered and connected by low-power, low-bandwidth wireless networks to the Internet.

The present techniques recognize the need to enable devices to access remote resources in an improved manner over the prior art.

According to a first technique there is provided a computer implemented method of accessing a remote resource by an internet-connectable device, the method comprising: receiving, at the device from the bootstrap server, a first plurality of identifiers each identifier associated with a respective connectivity server; selecting, at the device, a first identifier from the first plurality of identifiers; authenticating with a first connectivity server associated with the selected first identifier.

According to a further technique there is provided a computer implemented method of bootstrapping an internet-connectable device by a bootstrap server, the method comprising: transmitting, from the bootstrap server to the device, credential data comprising a first plurality of identifiers, each identifier in the first plurality of identifiers associated with a respective connectivity server, the credential data to render the device operable to select a first identifier from the first plurality of identifiers and authenticate with a connectivity server associated with the first identifier.

According to a further technique there is provided a computer implemented method of generating identifiers at a first server to enable a device to access a resource, the method comprising: obtaining, at the first server, characteristic data for a plurality of connectivity servers; updating, at the first server, a database with the characteristic data; selecting, at the first server, a first set of identifiers for the plurality of connectivity servers based on or in response to the characteristic data.

According to a further technique there is provided a system comprising: a plurality of connectivity servers, each connectivity server to receive data from one or more resources; a first server to store identifiers for some or all of the connectivity servers of the plurality of connectivity servers; a device comprising circuitry to: receive a set of identifiers from the first server; select an identifier from the set; authenticate with a connectivity server associated with the selected identifier.

The present techniques are diagrammatically illustrated, by way of example, in the accompanying drawings, in which.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

A network, such as an Internet of Things network, may comprise multiple connected devices and resources with different functionalities. The devices and resources may be provided by different parties, and typically, the devices are resource-constrained with limited power supply, communication capability, CPU performance and memory.

Generally speaking, a bootstrap or bootstrapping process includes some or all of the steps that enable a new device to join a network and to authenticate (e.g. communicate, connect, register, enrol etc.) with one or more resources to access one or more services.

Traditional networks include load balancers which balance resource requests from devices across different connections or different resources and to provide redundancy in the case of resource servers becoming unavailable.

Broadly speaking, the present techniques provide improvements to traditional networks.

Figure 1:
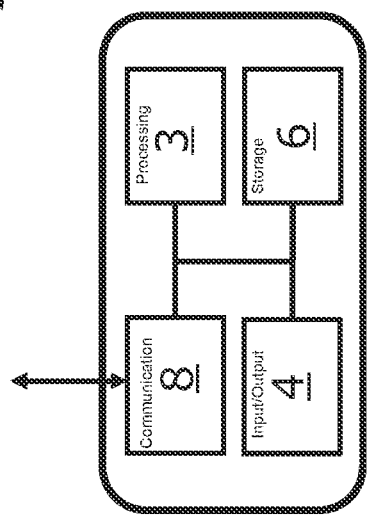
FIG. 1 shows a schematic illustration of a device according to an embodiment.

FIG. 1 shows a data processing device 2, which is capable of authenticating with one or more remote resources (e.g. device, server, service, apparatus).

Device 2 may be a computer terminal, a laptop, a tablet or mobile-phone, or may, for example, be a lightweight machine-to-machine (LwM2M) device used to turn objects into "smart-objects" such as streetlights, electric meters, temperature sensors and building automation as part of the IoT. It will be appreciated that the examples of devices are exemplary only and the claims are not limited in this respect.

The device 2 comprises processing circuitry 3 for controlling various processing operations performed by the device 2.

The device 2 may further comprise input/output circuitry 4, such that the device 2 can receive inputs (e.g. user inputs, sensor inputs, measurement inputs etc.) and/or generate outputs (e.g. audio/visual/command instructions or requests etc.).

The device 2 further comprises storage 6 for storing data, such as credential data, whereby the storage circuitry 6 may comprise volatile and/or non-volatile memory.

Such credential data may include one or more of: certificates, cryptographic keys (e.g. shared symmetric keys, public keys, private keys), identifiers (e.g. direct or indirect identifiers) etc.) whereby such credential data may be used by the device to authenticate (e.g. communicate/connect/register/enrol) with one or more remote resources.

When the identifier requires name resolution, a name resolution service, such as DNS, may be used to resolve the indirect identifier to be a direct identifier. Such an identifier requiring resolution is hereafter an "indirect identifier". Indirect identifiers may include one or more of: a fully qualified domain name (FQDN), a Uniform Resource Locator (URL)), a Uniform Resource Indicator (URI) and a Uniform Resource Name (URN), although this is not an exhaustive list.

When the provisioned identifier does not require name resolution (hereinafter "a direct identifier") such as an IP address (e.g. IPv4 or IPv6 address) the device can reach the address associated with the direct identifier.

The credential data may also be used as an input to a security protocol to establish a secure communications channel with a remote resource. Such a security protocol may, for example, comprise Transport Layer Security/Datagram Transport Layer Security (TLS/DTLS), whereby TLS/DTLS is used to provide a secure channel between the device 2 and a remote resource, whereby TLS/DTLS security modes include both pre-shared key and public key technology, whereby such keys may be included in credential data provisioned on the device. The data (e.g. device data) protected by TLS/DTLS may be encoded as plain text, binary TLV, JSON, CBOR, or any other data exchange formats.

Device 2 further comprises communication circuitry 8 which may use a wireless communication, such as communication using wireless local area network (Wi-Fi), short range communication such as radio frequency communication (RFID) or near field communication (NFC), or communications used in wireless technologies such as ZigBee, Thread, Bluetooth, Bluetooth LE, IPv6 over Low Power Wireless Standard (6LoWPAN) or Constrained Application Protocol (CoAP). Also, the communication circuitry may use a cellular network such as 3G or 4G. The communication circuitry may also use wired communication such as using a fibre optic or metal cable. The communication circuitry 8 could also use two or more different forms of communication, such as several of the examples given above in combination.

The device 2 may use the communication circuity 8 to communicate with one or more remote resources which may be, for example, a device, an apparatus, a server, a service etc. Such a remote resource may be part of, or interface with one or more public networks (e.g. the internet) and/or private networks enabling deployment of services in a secure manner from a private server, private cloud or public cloud environment.

As above, a remote resource may comprise one or more servers to provide one or more devices with access to one or more services hereafter "resource servers".

In embodiments the resource server may comprises hardware, software or a combination of both capable of providing server functionality, for example to provide access to one or more services with which it interfaces or hosts, whereby such services may include one or more data storage & analytics services, management services, application services, web services (e.g. a web application), although this list is not exhaustive. Such a resource server may, for example, be a gateway device in a home, a machine-to-machine (M2M) server, a LwM2M server, a cloud server, an infrastructure server, an edge server, a computer terminal, a laptop, a tablet or mobile-phone, an application hosted on a server or may itself be a device 2.

Figure 2:
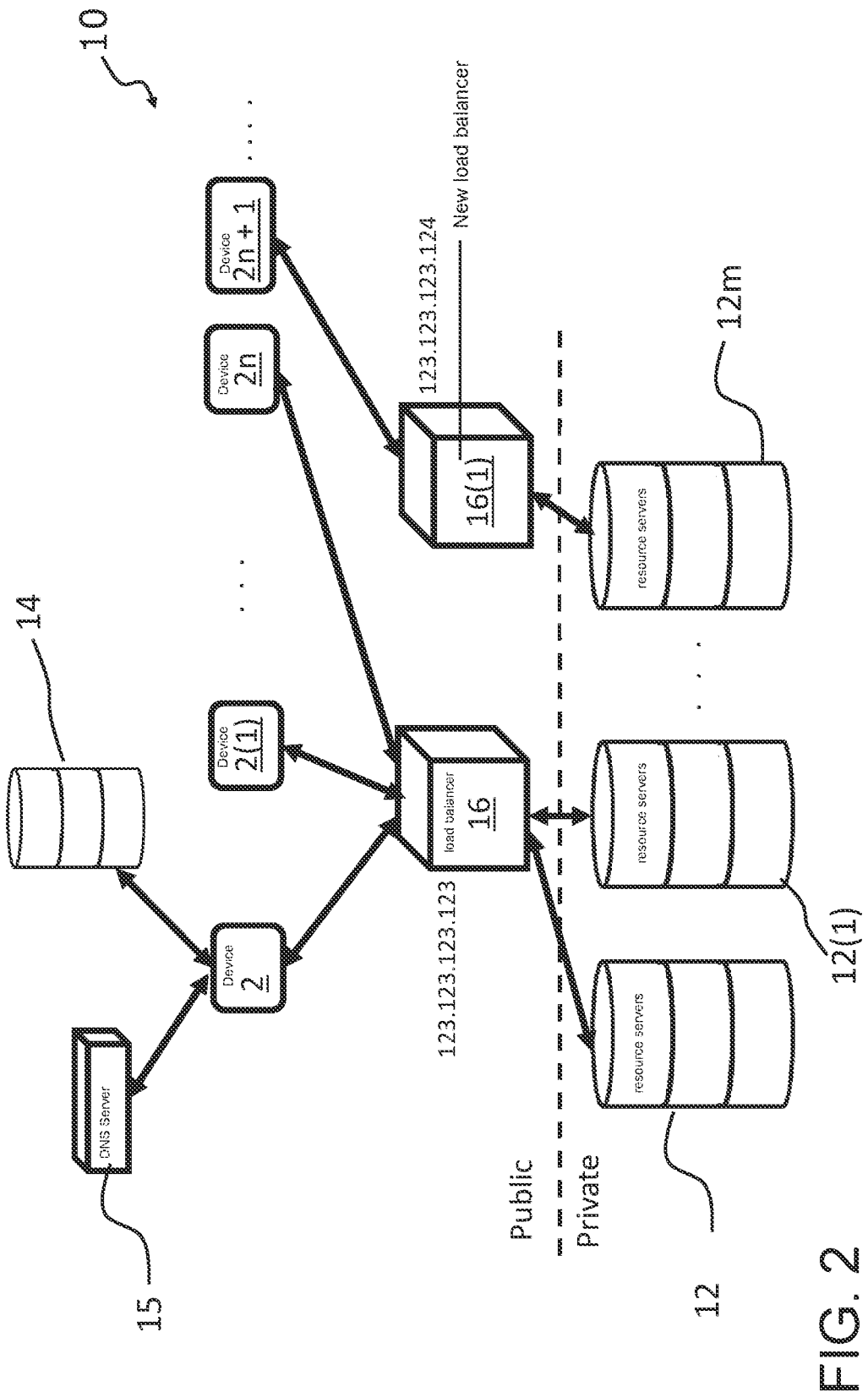
FIG. 2 shows a schematic diagram of a system in which a device can access a resource server.

FIG. 2 shows a schematic diagram of a system 10 in which device 2 accesses one or more services.

As part of a bootstrap process with bootstrap server 14, the device 2 is provisioned with credential data to access the one or more services provided by resource servers 12-12$m$.

Such credential data may include a certificate comprising an indirect identifier (e.g. DNS.ARM.com), whereby the device may use a domain name system (DNS) 15 server to resolve the indirect identifier to a direct identifier (e.g. 123.123.123.123), which identifies the location of a load balancer 16. In other embodiments the device 2 may be provisioned with DNS capabilities to resolve the indirect identifier rather than communicating with a separate DNS server 15.

The device 2 will then send a server access request to the load balancer 16 identified by the direct identifier, whereby the load balancer 16 forwards the request to the resource server 12.

As will be appreciated, the load balancer 16 may receive requests from a plurality of devices 2$n$ (where 'n' is an integer), and forwards the requests to one or more resource servers 12($m$) (where 'm' is an integer), such that the resource servers 12-12($m$) are not overloaded with traffic from the different devices.

A single virtual load balancer 16 may be capable of balancing requests from, for example, up to n=1,000,000 devices.

A new load balancer 16(1), located at a different address (e.g. 123.123.123.124) may be added to the system 10 to handle requests from devices, where n>1,000,000. If 'n' increases to 100 million then 100 load balancers would be required, along with the associated licences and computing costs to operate the load balancers.

Furthermore, different load balancers may only be capable of servicing requests from resource servers which use a particular type of communication protocol (e.g. CoAP, LORA, MQTT, HTTP); resource servers which use a particular type of security protocol (e.g. HTTPS, TLS, TLS/DTLS); resource servers which provide a particular type of service; or resource servers which are owned by a particular party. As such, a different load balancer will be required for each different type of communication protocol, security protocol, type of service and/or for each different owner.

As such, scaling up to millions/billions/trillions of devices would require the addition of multiple load balancers, which would place a cost and set-up burden on the administrator of the system.

Load balancers are generally made available on a public network (e.g. the internet), whilst the resource servers are generally within a private network (e.g. an intranet). Therefore, load balancers generally provide a large attack vector, whereby a rogue 3rd party could attack the DNS server which resolves the load balancer in a denial of service (DoS) attack to deny a service provided by the load balancer.

Furthermore, load balancers provide for high availability whereby, for example, each load balancer 16 may have a back-up load balancer (not shown) which constantly monitors the operating performance thereof, such that when the load balancer 16 fails, the back-up load balancer can take over the functionality thereof. Providing high availability increases the expense of a system due to the increased number of load balancers required, especially when scaling to millions/billions/trillions etc. of devices.

Figure 3A:
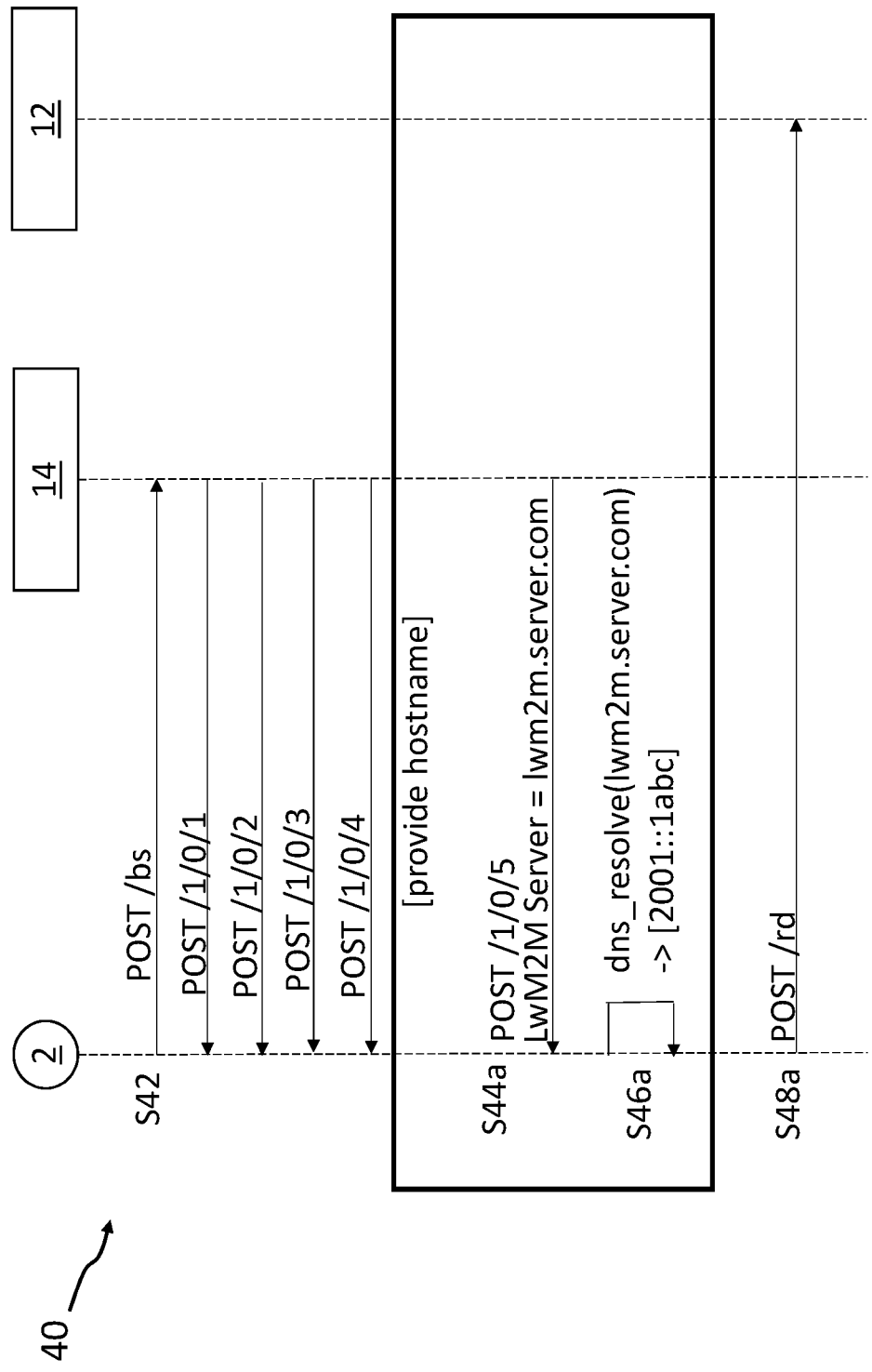
FIG. 3a shows a schematic diagram of an example bootstrap process for a device in the system of FIG. 2.
Figure 3B:
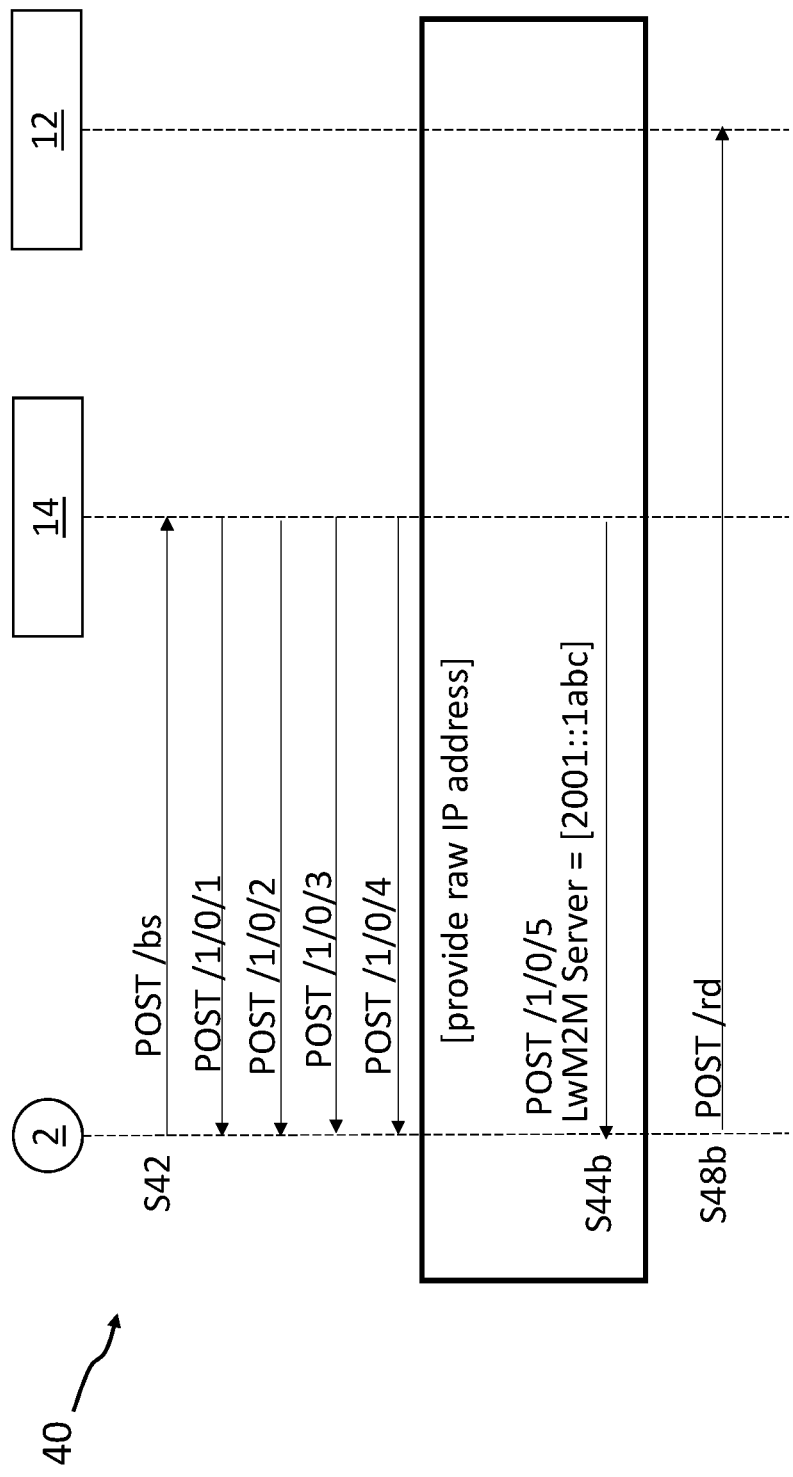
FIG. 3b shows a schematic diagram of a further example of a bootstrap process for a device in the system of FIG. 2.

FIGS. 3a and 3b show schematic diagrams of an example bootstrap process 40 for the device 2 of FIG. 2 above.

At S42, the device 2 initiates a bootstrap process with bootstrap server by transmitting a request comprising 'POST /bs' to the bootstrap server 14.

The Bootstrap server 14 accepts the request and responds by transmitting an acknowledgement to the device (not shown in FIG. 3a or 3b), and transmitting messages comprising credential data to the device 2 as depicted at "POST /1/0/1" to "POST /1/0/5", whereby the credential data may include one or more of: rules, policies, certificates, cryptographic keys and an identifier to enable the device 2 to authenticate with a resource.

As depicted in FIG. 3a, the credential data at S44a POST /1/0/5 is an indirect identifier in the form of a URI. At S46a, the device resolves the URI to a direct identifier 2001::1abc, whereby at S48a the device authenticates with the resource server 12 (via a load balancer (not shown)) associated with the resolved direct identifier.

In a further example, as depicted in FIG. 3b, the credential data at S44b POST /1/0/5 is a direct identifier in the form of an IP address, whereby at S48b the device authenticates with the resource server 12 (via a load balancer (not shown)) associated with the direct identifier.

Figure 4:
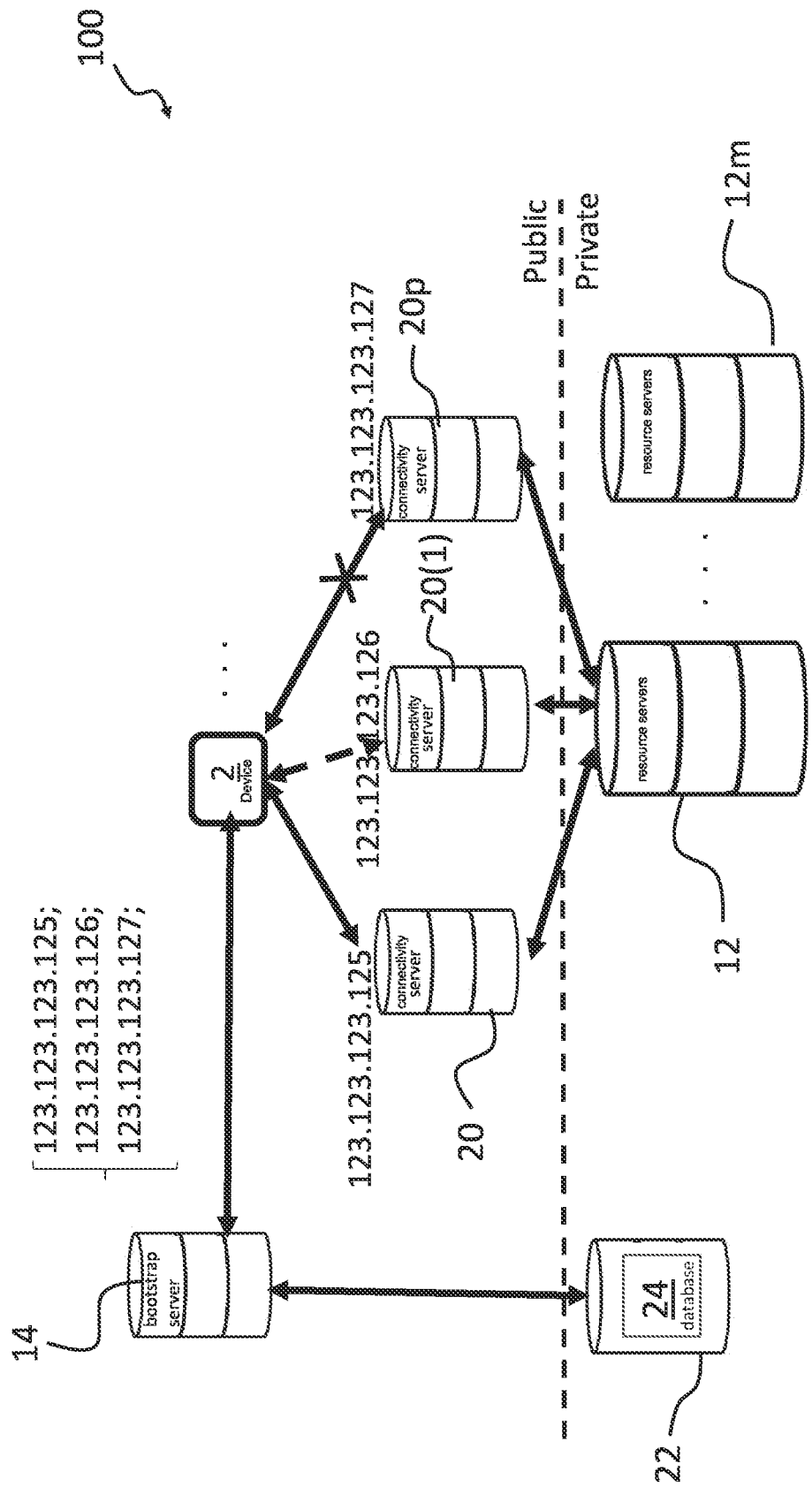
FIG. 4 shows a schematic diagram of a system in which a device can access one or more services according to an embodiment.

FIG. 4 shows a schematic diagram of a system 100 in which device 2 accesses one or more services at a resource server 12, according to an embodiment.

As part of a bootstrap process with bootstrap server 14, the device 2 is provisioned with credential data to access one or more services provided by resource servers 12-12m.

In the present illustrative example of FIG. 4, such credential data may include a certificate and may further comprise a plurality of direct identifiers, whereby each direct identifier of the plurality may be used to communicate with a connectivity server 20-20p (where 'p' is an integer).

The device 2 will then send a server access request to a connectivity server identified by a direct identifier of the plurality as selected at the device 2. The device 2 may select the identifier from the plurality of identifiers based on or in response to one or more of: instruction(s), rule(s) or policy(ies) in storage (e.g. provisioned by an administration or during the bootstrapping process), in a random manner, pseudorandom manner, or in a structured manner (e.g. in sequential order, in a round robin manner etc.) although the claims are not limited in this respect.

The connectivity server(s) 20-20p may be registered with one or more of the resource servers 12-12m, so as to communicate therewith (e.g. via secure communications channels). In embodiments, a connectivity server will provide data received from the device 2 to one or more of the respective resource servers 12-12m. In other embodiments a connectivity server 20 may provide command instructions received from a remote resource to device 2. Such a command instruction may be generated by a service based on or in response to data received from the device 2. Therefore, the connectivity server 20 functions as a relay for data from a device 2 to a remote resource 12 and/or from a remote resource 12 to a device 2.

The present techniques mean that a device that is provisioned with a direct identifier does not need to resolve an indirect identifier, and can authenticate with a connectivity server associated with the direct identifier without the need to communicate with a DNS server or to resolve an indirect identifier.

Each connectivity server 20-20p may be capable of handling access requests from millions or billions of devices, and so connectivity servers are more cost efficient than using a load balancer, for example, when scaling up to millions/billions/trillions of devices. When a connectivity server is at or is approaching capacity, a new connectivity server can be created, and the devices provided with the direct identifier therefor. When a connectivity server requires an update and may be unavailable for a period of time, the devices may be provisioned with identifiers for connectivity servers that are available.

An administrator server 22 may spawn or create connectivity servers at public addresses (e.g. on the internet) and maintain a database 24 of characteristic data for the connectivity servers thereat, wherein the characteristic data may comprise one or more of: an identifier the connectivity server (e.g. an IP address for the connectivity server); security protocol used by a connectivity server (e.g. TLS, HTTPS, TLS/DTLS etc); location of the connectivity server (e.g. geographic location); system maintenance schedule for a connectivity server (e.g. when is next system update scheduled), device handling capacity for a connectivity server (e.g. can handle requests from up to 'n' devices); storage size for a connectivity server (e.g. 1 TB storage); connection type which the connectivity server can service (CoAP; LORA; HTTP); etc.), current operation status for a connectivity server (e.g. available to service requests or unavailable).

In embodiments the administrator server 22 communicates with the connectivity servers to obtain such characteristic data so as update the characteristic data in the database 24 for the connectivity servers.

In embodiments, and as depicted in FIG. 4, administrator server 22 may not be located at a public address(es), and may comprise a bespoke port (e.g. IP controlled) to communicate with the connectivity servers, whereby such communication may be established using end-to-end security (e.g. HTTPS; TLS/DTLS).

The administrator server 22 may then provide all or a subset of the identifiers to the bootstrap server 14, which can, in turn, select a further subset of identifiers for the connectivity servers, and provision the further subset on the device 2.

The identifiers provisioned on a particular device may be selected by the bootstrap server 14 or the administrator server 22 based on or in response to one or more of: instruction(s), rule(s) or policy(ies) in storage, in a random manner, pseudorandom manner, or in a structured manner (e.g. in sequential order, in a round robin manner etc.).

As such, the identifiers may be selected using proactive scheduling, whereby, as an illustrative example, an identifier for a connectivity server approaching its connection load capacity threshold or which is due to undergo servicing within a threshold period (e.g. 24 hours) will not be selected for provisioning on the device. As a further illustrative example, the connectivity servers may be selected to spread or balance the connection load around the set of connectivity servers.

Additionally, or alternatively, the identifiers may be provided using reactive scheduling, whereby an identifier for a connectivity server has reached capacity or which is currently unavailable will not be selected for provisioning on the device.

In some embodiments the bootstrap server 14 or the administrator server 22 may select the identifiers provisioned on a particular device based on or in response to the characteristic data and/or the credential data of the particular device. For example, the administrator server 22 or the bootstrap server 14 may select the identifiers for a particular device based on one or more of: location of the; storage capacity of the device; connection capabilities (e.g. device can use CoAP); security capabilities (e.g. device can communicate using TLS/DTLS; HTTPS etc) and ownership of the device although this list in not exhaustive.

As an illustrative example, devices may be provisioned with the direct identifiers for the closest connectivity servers 20-20p thereto, to reduce latency of communications between the device and a connectivity server. As a further illustrative example, a device may be provisioned with direct identifiers for connectivity servers owned by a particular party to enable the device to only connect to connectivity servers owned by the particular party.

When the device 2 attempts to authenticate with a first connectivity server associated with a selected first identifier, but that first connectivity server is unavailable (e.g. due to maintenance or a DoS attack), the device may attempt to authenticate with a second connectivity server associated with a selected second direct identifier. Similarly, when the second connectivity server is unavailable, the device may attempt to authenticate with a third connectivity server associated with a selected third direct identifier and so forth.

When the device has unsuccessfully attempted authentication using all identifiers provisioned thereon, it may retry authenticating with the connectivity servers by re-selecting the identifiers thereon.

Additionally, or alternatively, the device 2 may transmit a request to the bootstrap server for an updated list of identifiers.

When the identifiers for the connectivity servers are direct identifiers, there is no requirement to resolve the direct identifiers using a DNS, and so a rogue $3^{rd}$ party would be required to perform a successful bootstrapping process with the bootstrap server 14 in order to obtain the direct identifier for the connectivity server 20.

Nevertheless, should a rogue $3^{rd}$ party perform a DoS attack on a connectivity server by flooding a random address that happened to be that of the connectivity server, the administrator server 22, which is in communication with all connectivity servers to obtain characteristic data therefrom, will detect that the connectivity server is at or approaching a threshold capacity, and will not provision devices with identifiers for that connectivity server, but will instead select identifiers for available connectivity servers.

In embodiments the administrator may retire a connectivity server (e.g. 20p) or determine it to be unavailable, such that devices will no longer be able to connect thereto using the associated direct identifiers provisioned thereon, and will connect to a further connectivity server (e.g. 20(1)) instead.

In embodiments, and as depicted in FIG. 4, the resource servers 12-12m may not be located at private addresses (e.g. in an intranet), and may each comprise a bespoke port (e.g. IP controlled) to communicate with the connectivity servers 20-20p, whereby such communication may be established using end-to-end security (e.g. HTTPS; TLS/DTLS).

In some embodiments a connectivity server 20 receives device data from one or more devices 2 and stores the device data thereat. Resource servers 12-12m may then communicate with the connectivity server 20 via a REST interface to access the device data stored at the connectivity server 20. The resource server may also provide one or more command instructions for one or more devices to the connectivity server, whereby the connectivity server will transmit the command instructions to the respective devices.

Additionally, or alternatively, the connectivity servers 20-20p may put the device data on a queue, and the resource servers 22 may take the device data from the queue for processing.

In some embodiments the resource server 12-12m may put one or more command instructions for one or more devices on a queue, and the connectivity server 20 may take the command instructions from the queue and transmit the command instructions to the respective devices.

Whilst FIG. 4 generally depicts the device authenticating with connectivity servers by selecting associated direct identifiers, in some embodiments the device may be provided with a plurality of indirect identifiers, or a combination of direct and indirect identifiers. The device will resolve indirect identifiers (e.g. using DNS) to determine a direct identifier for an associated connectivity server.

Figure 5:
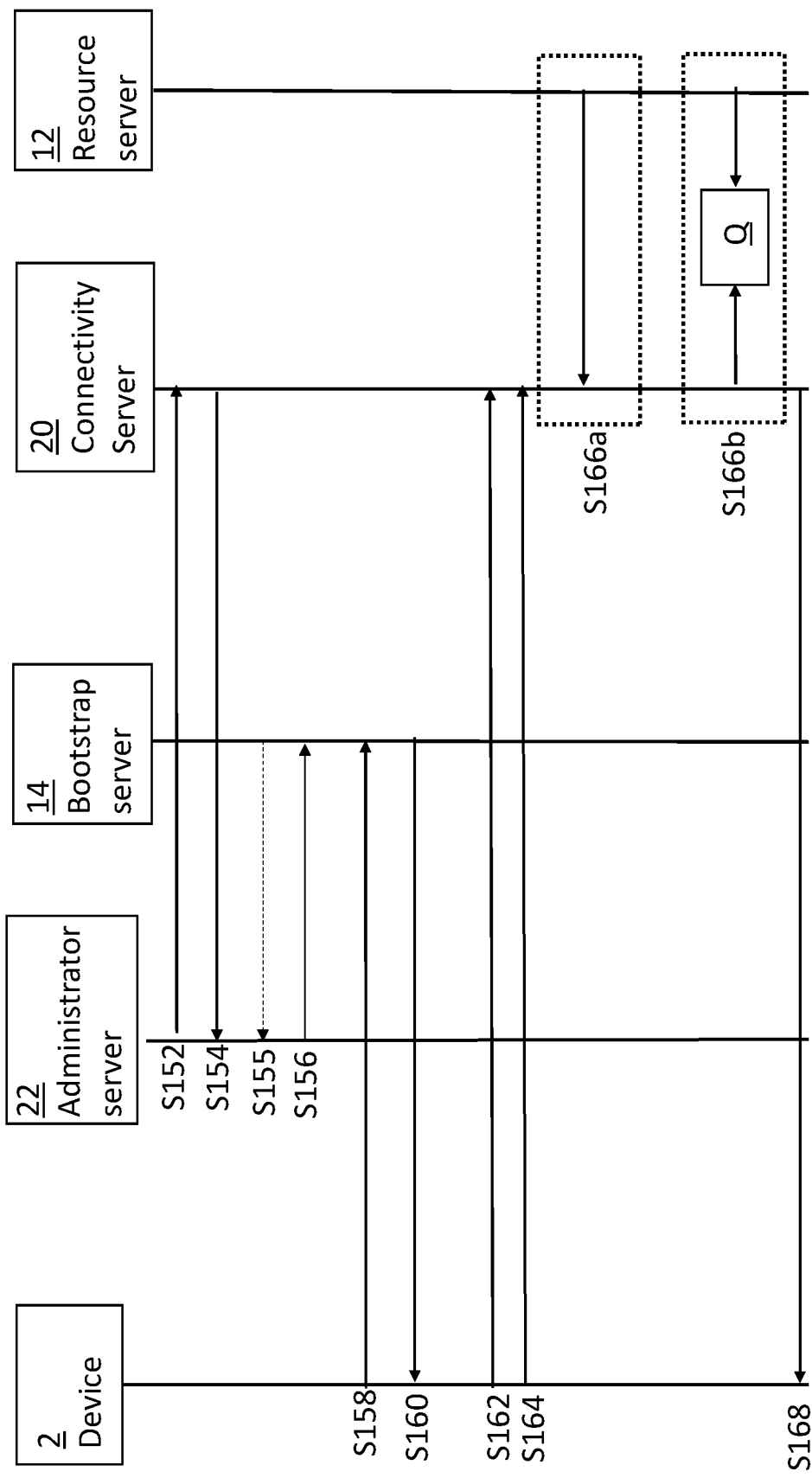
FIG. 5 shows a schematic diagram of an example process in which a device is provisioned with data to access one or more remote resources.

FIG. 5 shows a schematic diagram of an example process 150 in which a device 2 is provisioned with data by a bootstrap server 14, to enable the device 2 to access one or more services. A resource server 12 (or service provided by the resource server 12) can then communicate with the connectivity server 20 to access the data from the device 2, or to provide command instructions for the device 2.

At S152, administrator server 22 spawns or creates a connectivity server 20. As an illustrative example, the administrator server 22 may detect that other connectivity servers in a network (e.g. the internet) are reaching a threshold capacity and create the new connectivity server 20. As a further illustrative example, the administrator server may create a connectivity server in a particular location (e.g. Europe) to reduce the latency for devices based in or near that location, which may otherwise have had to authenticate with a connectivity server in other parts of the world.

At S154, the new connectivity server 20 confirms to the administrator server 22 that it is available to serve devices and may provide characteristic data to the administrator server 22. The administrator server 22 may update a database 24 of available connectivity servers and the associated characteristic data.

At S155, the bootstrap server 14 optionally requests a list of identifiers for connectivity servers to provision on a device which is authenticated therewith. Such a request may specify one or more criteria for the characteristics of the connectivity servers, such as type, location, owner, security protocol etc.

At S156, the administrator server 22 provides the bootstrap server 14 with a plurality of identifiers for connectivity servers. In embodiments, the plurality of identifiers are selected based on or in response to the one or more criteria set by the bootstrap server 14.

At S158 the device 2 performs a bootstrap process with bootstrap server 14, whereby at S160 the bootstrap server provisions credential data comprising the plurality of identifiers or a subset of the plurality of identifiers received from the administrator server on the device 2.

At S162, the device 2 authenticates with a connectivity server associated with an identifier selected from the plurality of identifiers provisioned thereon. The device 2 may determine which identifier should be selected, and therefore which connectivity server to connect to, in a random or pseudorandom manner or based on or in response to a rule or policy which may be provisioned thereon during a factory provisioning process or during the bootstrap process.

Although not depicted in FIG. 5, the device 2 and connectivity server 20 may transmit other data between each other. In an illustrative example, the device 2 may establish secure communications with the connectivity server using other credential data such as certificates and/or cryptographic keys provisioned thereon.

At S164 the device 2 transmits device data to the connectivity server 20.

The resource server 12 may then access the device data, whereby in an illustrative example depicted at S166a the resource server 12 accesses the device data via an interface (e.g. REST interface) at the connectivity server 20.

In an additional, or alternative, example, at S166b the connectivity server 20 puts the device data on a queue (Q), from which the resource server 12 gets the device data.

The resource server 12 may also provide to the connectivity server (e.g. via the REST interface or the queue) one or more command instructions for the device 2, whereby at S168 the connectivity server 12 transmits the one or more command instructions to the device 2, which the device 2 will process thereat.

For example, the resource server 12 may provide a service comprising a web application having a front end at which device data received from a device is presented to a user (e.g. via a mobile device). The user may provide an input at the front end, which in turn causes the resource server to provide command instructions to the device.

As an illustrative example, the device 2 may be a movable camera located in a house. A user may, via a web application running on a mobile device, request that the device 2 generates an image, whereby the web application causes a command instruction to be provided from the resource server to the connectivity server, and then provided to the device. In response to the command instruction, the device captures an image in response to the command instruction, and returns image data to the connectivity server, which is accessed by the resource server and presented to the user via the web application. The user may send further command instruction(s) (e.g. command the camera to move, turn on a light etc), and may receive further device data back from the device.

The device 2 may continue to transmit device data to the connectivity server until for example, the connectivity server 20 becomes unavailable. When the connectivity server 20 becomes unavailable, the device 2 will authenticate with a further connectivity server by selecting a different identifier from the plurality of identifiers provisioned thereon. The device 2 may determine which different identifier should be selected, and therefore which further connectivity server to connect to based on or in response to one or more of: instruction(s), rule(s) or policy(ies) in storage (e.g. provisioned by an administration or during the bootstrapping process), in a random manner, pseudorandom manner, or in a structured manner (e.g. in sequential order, in a round robin manner etc.) although the claims are not limited in this respect.

When the device can no longer connect to any connectivity server with identifiers provisioned thereon, or when it is instructed to do so (e.g. via a command instruction), the device may authenticate with the bootstrap to perform a bootstrap process with bootstrap server 14. The bootstrap server will provision updated credential data comprising a plurality of identifiers on the device 2.

Figure 6:
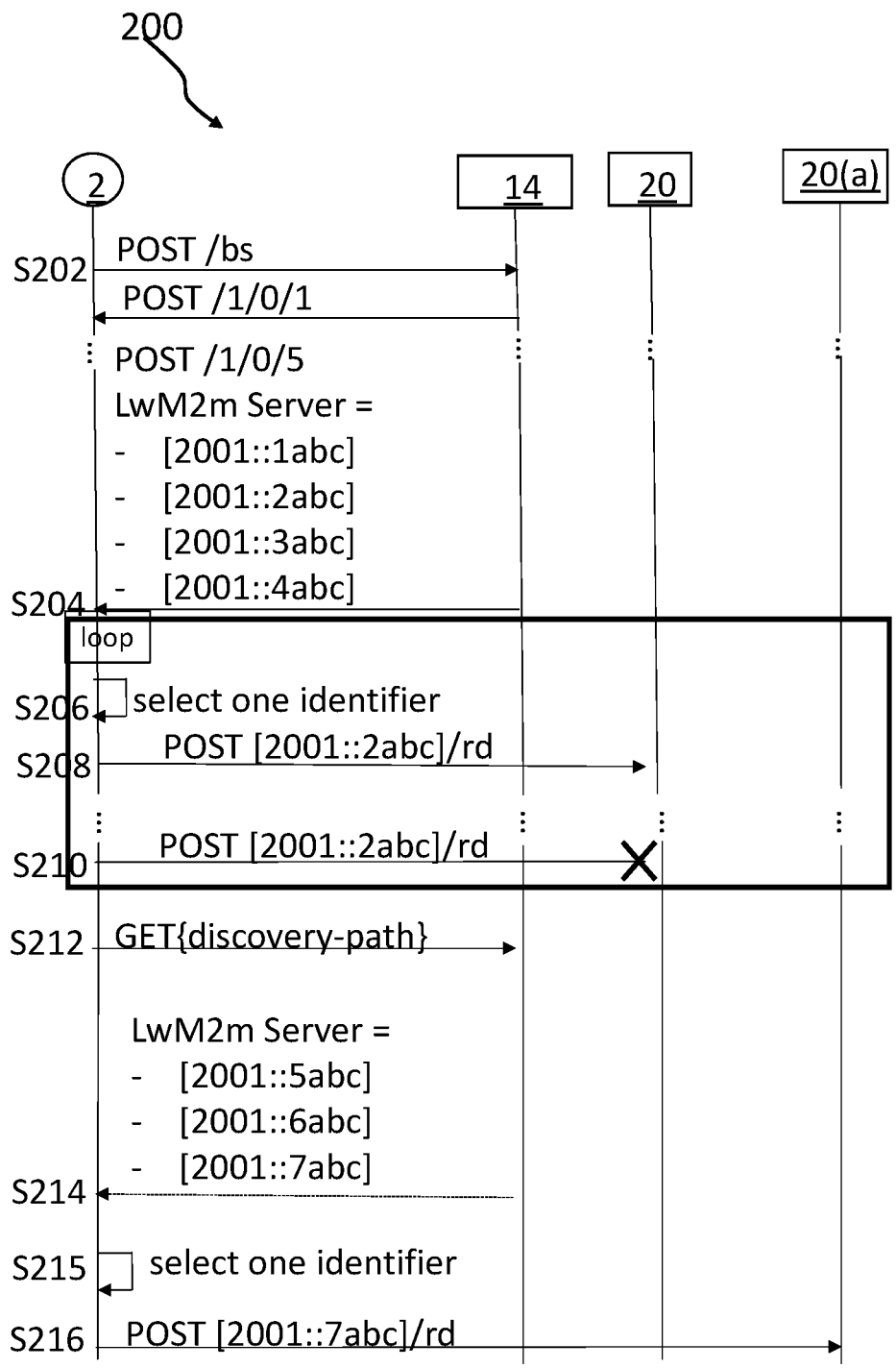
FIG. 6 shows a schematic diagram of an example bootstrap process according to an embodiment.

FIG. 6 shows a schematic diagram of an example bootstrap process 200 according to an embodiment. Such a bootstrap process may use 6LoWPAN, which is a set of standards to enable the efficient use of IPv6 over low-power, low-rate wireless networks on devices through an adaption layer and the optimization of related protocols.

The Open Mobile Alliance's LwM2M standard is applicable to 6LoWPAN whereby a LwM2M bootstrap process is used to provide mandatory credential information through a bootstrap interface for devices so that the devices can authenticate with one or more servers, whereby authentication assigns a device to a server to access one or more services (e.g. applications, databases etc.).

At S202, the device 2 initiates a bootstrap process with bootstrap server by transmitting a request comprising 'POST /bs' to the bootstrap server 14.

The device 2 may authenticate itself with the bootstrap server by for example using credential data (e.g. bootstrap certificate(s), bootstrap identifier(s), cryptographic key(s)) provisioned thereon (e.g. during a factory provisioning process or owner registration process).

The bootstrap server 14 accepts the request and responds by transmitting an acknowledgement to the device (not shown in FIG. 6), and transmitting messages comprising credential data to the device 2 as depicted at "POST /1/0/1" to "POST /1/0/5", whereby the credential data may include one or more of: rules, policies, certificates, cryptographic keys and an identifier to enable the device 2 to authenticate with a resource to enable the device to access one or more services.

For example the credential data may define what protocol is required to be used to establish communications with the bootstrap server or a connectivity server. The credential data may also provide certificates establishing secure communications with the bootstrap server or connectivity server.

The device 2 may acknowledge all transmissions by responding with a confirmation POST (not shown in FIG. 6).

As depicted in FIG. 6, the credential data at S204 POST /1/0/5 comprises a plurality of direct identifiers, whereby four direct identifiers are depicted in FIG. 6 (i.e. [2001::1abc]; [2001::2abc]; [2001::3abc]; and [2001::4abc]).

To access a service, the device 2, at S206 selects a direct identifier to use. As above, the device may select the direct identifier based on or in response to one or more of: instruction(s), rule(s) or policy(ies) in storage (e.g. provisioned by an administration or during the bootstrapping process), in a random manner, pseudorandom manner, or in a structured manner (e.g. in sequential order, in a round robin manner etc.) although the claims are not limited in this respect.

At S208, the device uses the selected direct identifier to authenticate with first connectivity server 20, which in turn transmits device data to remote resource (not shown) and/or transmits data (e.g. command instructions) from remote resource to the device 2.

At S210, the selected direct identifier no longer enables the device to access the one or more services (e.g. because the connectivity server is unavailable), whereby the device selects (as at S206) a different direct identifier to use. As above, the device may select the different direct identifier based on or in response to one or more of: instruction(s), rule(s) or policy(ies) in storage (e.g. provisioned by an administration or during the bootstrapping process), in a random manner, pseudorandom manner, or in a structured manner (e.g. in sequential order, in a round robin manner etc.) although the claims are not limited in this respect.

At S212, when none of the direct identifiers provide access to a service (e.g. all connectivity servers are unavailable), the device may perform a further bootstrap process with bootstrap server 14.

In an embodiment, the device 2 may perform a full bootstrap process as set out at S202 to S204 in FIG. 6. In another embodiment, when the device 2 is already authenticated with the bootstrap server 14, the device 2 may use a discovery process to request updated identifiers from the bootstrap server. As depicted in FIG. 6, the devices transmits a bootstrap request comprising 'GET {discovery-path}', whereby at S214 the bootstrap server 14 provides identifiers (depicted in FIG. 6 as direct identifiers (i.e. [2001::5abc]; [2001::6abc]; [2001::7abc]). Therefore, there is no requirement for the device to engage in a full bootstrap process to obtain updated identifiers, thereby reducing processing power, storage requirements etc.

At S215, the device 2 selects an identifier from the identifiers provisioned at S214, and at S216 authenticates with second connectivity server 20(*a*) associated with the selected identifier, which in turn transmits device data to a remote resource (not shown) and/or transmits data (e.g. command instructions) from remote resource to the device 2.

Whilst the embodiments above generally describe a device-initiated bootstrap process the claims are not limited in this respect and in some embodiments the device may be provided with a plurality of identifiers for respective connectivity servers during a factory provisioning process, via a smartcard, wired communication, or whereby the bootstrap server may initiate a bootstrap process with the device, whereby the bootstrap server will have knowledge of when the device is ready for bootstrapping. The bootstrap server may gain this knowledge using any appropriate means.

Figure 7:
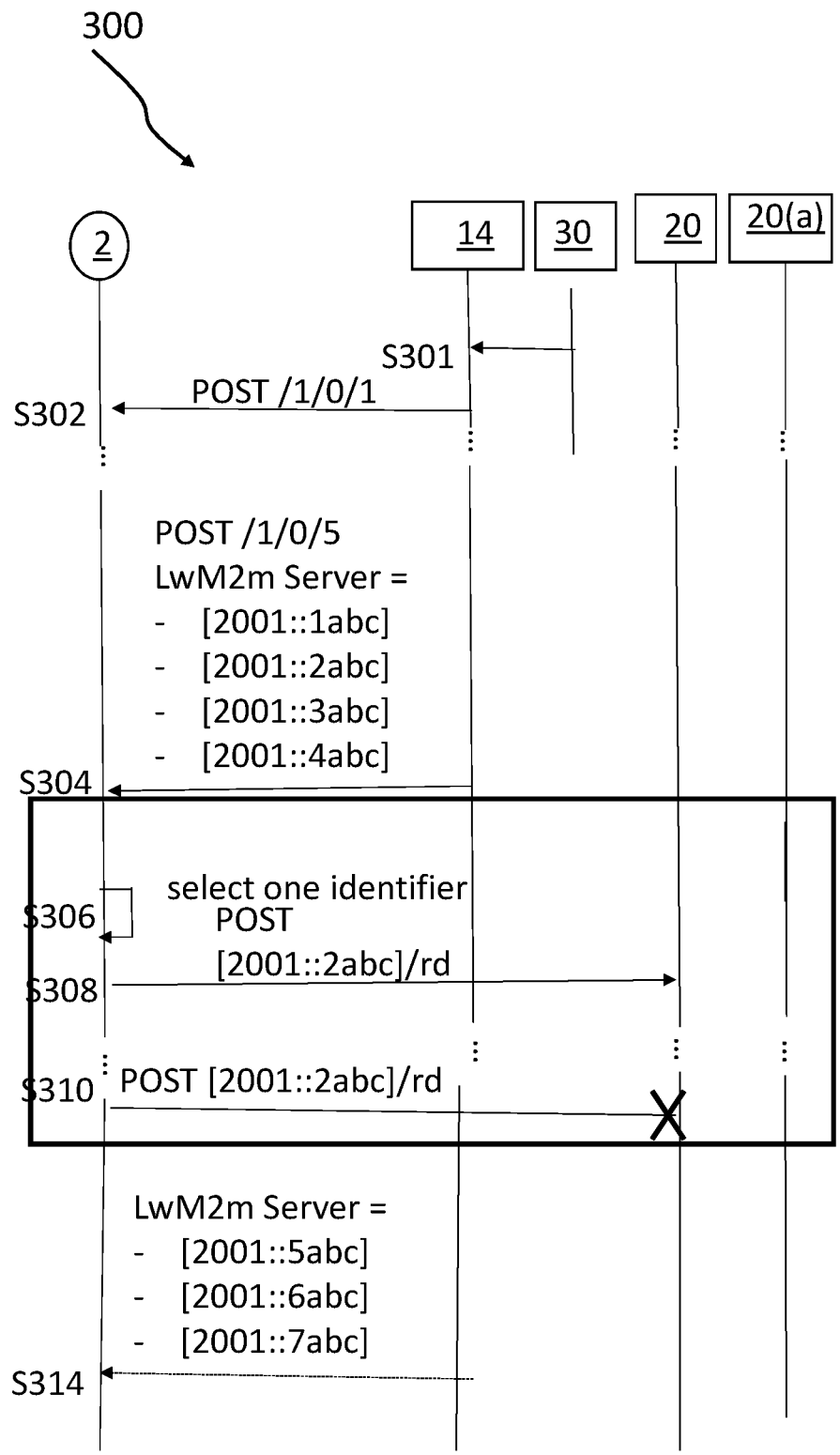
FIG. 7 shows a schematic diagram of an example bootstrap process according to an embodiment.

As an illustrative example as depicted in FIG. 7, entity 30 may be a server operated by a network provider, whereby at S301 entity 30 informs the bootstrap server 14 of the device 2 when device 2 connects to the network provider's network.

Once the bootstrap server 14 has been notified that the device 2 is ready to receive the bootstrap information, the bootstrap server communicates with the device 2 using the POST operation as depicted at S302-S304 (or using e.g. "PUT" and/or "DELETE" operations as appropriate—not shown).

The device 2 can then select an identifier as at S306 and at S308 authenticate with connectivity server 20 associated with the selected identifier.

When one or more connectivity servers associated with identifiers provisioned on a device become unavailable or are due to become unavailable (e.g. as S310), the bootstrap server 14 may at S314 provision updated credential data on the device, the updated credential data comprising a plurality of updated identifiers, each associated with a respective connectivity server. The device can then select an identifier from the updated identifiers and authenticate with the associated connectivity server (not shown in FIG. 7).

In some embodiments the administrator server may communicate with a device to provision the identifiers thereon in addition to, or as an alternative to, the identifiers being provisioned from a bootstrap server.

In a further related aspect, the present techniques provide a non-transitory data carrier carrying code which, when implemented on a processor, causes the processor to carry out the method described herein.

The techniques further provide processor control code to implement the above-described systems and methods, for example on a general purpose computer system or on a digital signal processor (DSP). The techniques also provides a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A computer implemented method of accessing a remote resource at a resource server by an internet-connectable device, the method performed at the device, comprising:

establishing secure communications with a bootstrap server;

performing a bootstrap process with the bootstrap server comprising:

receiving, from the bootstrap server, a first plurality of identifiers each identifier associated with one of a respective first plurality of connectivity servers, each connectivity server located at a respective address on the internet with which the device can communicate;

terminating communications with the bootstrap server when the bootstrap process is complete;

determining based on or in response to a rule or policy provisioned thereon during a factory provisioning process, a first identifier to select from the first plurality of identifiers;

selecting the first identifier from the first plurality of identifiers;

establishing secure end-to-end secure communications with a first connectivity server associated with the selected first identifier;

accessing the resource at the resource server via the first connectivity server, where the resource server is hosted on a private network accessible to the device only via the connectivity servers;

when access to the resource server becomes unavailable via the first connectivity server:

determining based on or in response to a rule or policy provisioned thereon during a factory provisioning process, a second identifier to select from the first plurality of identifiers;

selecting the second identifier;

establishing secure end-to-end secure communications with a second connectivity server associated with the selected second identifier;

accessing the resource at the resource server via the second connectivity server, when access to all the connectivity servers of the first plurality of connectivity servers becomes unavailable:
establishing secure communications with the bootstrap server to perform a further bootstrap process to obtain a second plurality of identifiers each identifier of the second plurality associated with one of a respective second plurality of connectivity servers.

2. The method of claim 1, further comprising: transmitting, from the device to the first connectivity server, device data.

3. The method of claim 1, comprising:
receiving, at the device from the bootstrap server, a second plurality of identifiers each identifier associated with one of a respective second plurality of connectivity server;
selecting, at the device, an identifier from the second plurality of identifiers;
authenticating with a connectivity server associated with the selected identifier.

4. The method of claim 1, wherein selecting the first identifier comprises:
selecting the first identifier based on or in response to one or more of: an instruction, a rule, a policy, a random manner, a pseudorandom manner, and a structured manner.

5. The method of claim 1, wherein the first plurality of identifiers comprises one or more of: direct identifiers and indirect identifiers.

6. The method of claim 5, further comprising: resolving an indirect identifier to a direct identifier.

7. The method of claim 5, wherein a direct identifier comprises an internet protocol (IP) address.

8. The method of claim 5, wherein an indirect identifier comprises one of: a fully qualified domain name (FQDN), a Uniform Resource Locator (URL)), a Uniform Resource Indicator (URI) and a Uniform Resource Name (URN).

9. The method of claim 1, further comprising:
transmitting, from the device to a bootstrap server, a bootstrap request to initiate a bootstrap process with the bootstrap server.

10. An internet-connectable device to:
establishing secure communications with a bootstrap server;
performing a bootstrap process with the bootstrap server:
receive from the bootstrap server in the bootstrap process, a first plurality of identifiers each identifier associated with a respective first plurality of connectivity servers, each connectivity server located at a respective address on the internet with which the device can communicate;
terminate communications with the bootstrap server when the bootstrap process is complete;
determine, based on or in response to a rule or policy provisioned thereon during a factory provisioning process, a first identifier to select from the first plurality of identifiers;
select the first identifier;
establish secure end-to-end secure communications with first connectivity server associated with the selected first identifier; access the resource at a resource server via the first connectivity server, where the resource server is hosted on a private network accessible to the device only via the connectivity servers;
when access to the resource server becomes unavailable via the first connectivity server:
determine based on or in response to a rule or policy provisioned thereon during the factory provisioning process, a second identifier to select from the first plurality of identifiers;
select the second identifier;
establish secure end-to-end secure communications with a second connectivity server associated with the selected second identifier;
access the resource at the resource server via the second connectivity server;
when access to all the connectivity servers of the first plurality of connectivity servers becomes unavailable:
establish secure communications with the bootstrap server to perform a further bootstrap process to obtain a second plurality of identifiers each identifier of the second plurality associated with one of a respective second plurality of connectivity server.

11. A computer implemented method of bootstrapping an internet-connectable device by a bootstrap server, the method comprising:
establishing secure communications with the device;
performing a bootstrap process with the device: transmitting, from the bootstrap server to the device in the bootstrap process, credential data comprising a first plurality of identifiers, each identifier in the first plurality of identifiers associated with a respective connectivity server, each connectivity server located at a respective address on the internet with which the device can communicate,
terminating communications with the device when the bootstrap process is complete, wherein the credential data is to:
provide the device with the first plurality of identifiers from which the device, based on or in response to a rule or policy provisioned thereon during a factory provisioning process, determines a first identifier to select and establish secure end-to-end secure communications with a first connectivity server associated with the first identifier, to access a resource server via the first connectivity server, and when access to all the connectivity servers associated with the first plurality of connectivity servers becomes unavailable the bootstrap server is to:
establish secure communications with the device to perform a further bootstrap process to provide a second plurality of identifiers each identifier of the second plurality associated with one of a respective second plurality of connectivity server via which the device can access the resource server.

12. The method of claim 11, further comprising:
receiving, at the bootstrap server, a first bootstrap request from the device to perform a bootstrap process with the device.

13. The method of claim 11, comprising:
receiving, at the bootstrap server, from an administrator server, a set of identifiers; selecting, at the bootstrap server, the first plurality of identifiers from the set of identifiers.

14. The method of claim 13, wherein selecting the first plurality of identifiers from the set of identifiers comprises:
selecting the first plurality of identifiers based on or in response to one or more of: characteristic data of a plurality of connectivity servers and credential data of the device.

15. The method of any of claim 11, further comprising:
transmitting, to the device, credential data comprising a second plurality of identifiers, each identifier in the second plurality associated with a respective connectivity server, the credential data comprising the second plurality of identifiers to render the device operable to select a second identifier from the second plurality of identifiers and authenticate with a connectivity server associated with the second identifier.

16. The method of claim 15, further comprising:
receiving, at the bootstrap server, a bootstrap request from the device.

\* \* \* \* \*